3,001,319
FISHHOOK HOLDER
Edwin W. Sonner, Jr., 91—19 Hollis Court Blvd.,
Queens Village, N.Y.
Filed July 8, 1957, Ser. No. 670,505
1 Claim. (Cl. 43—42.74)

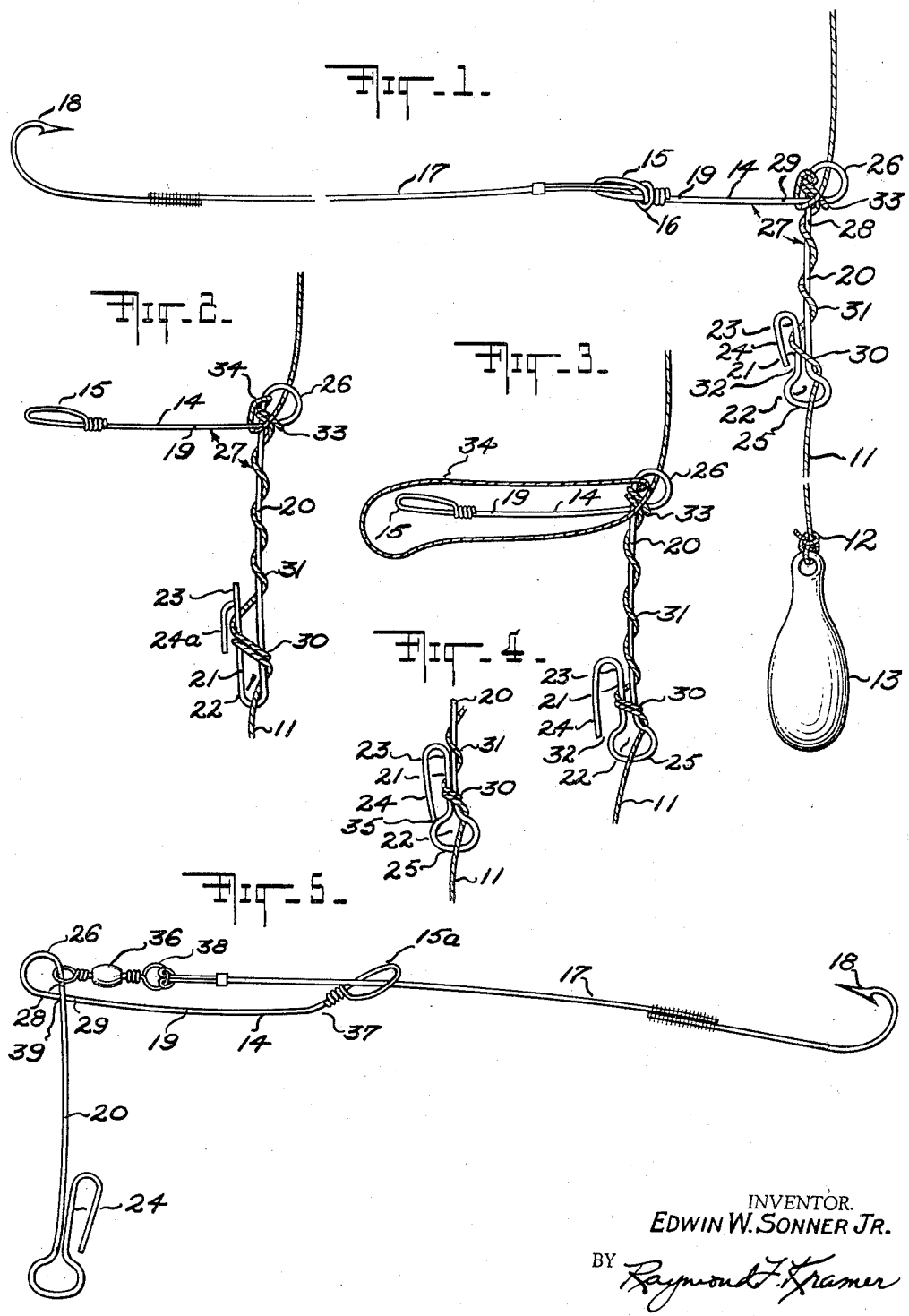

This invention is an improved device for holding an object to a flexible line. More particularly it relates to an easily attachable and removable item of fishing tackle to be used for affixing a fishhook to a fishline, and to a method of fastening the hook to the line.

It is sometimes necessary to be able to affix an object or objects to a line having no working ends. By use of the invented device such joinder can be made very simply without the use of knots and the attached object can be as easily removed. Where it is necessary to shift the location of the fastened object frequently the importance of the facility of joinder and removal is obvious. The present invention is especially useful in its application to the sport of fishing.

In bottom fishing often a sinker is tied to a fishline to "hold the bottom" and a baited snelled or leadered hook or a plurality of such hooks is tied to the line at a selected height or at different heights above the sinker. When it is desired to raise or lower the position of the hook with respect to the sinker or the bottom so that different heights may be fished it is usually necessary to cut the line or attempt to untie a tightened wet knot. With use of the present device the hook can be moved to a different position with respect to the sinker in only a matter of seconds.

It is an object of the present invention to provide a simply manufactured device for easily attaching but positively and removably holding a fishhook to a fishline. It is a further object to provide a fishhook attachment which is fastenable to a line without the necessity of making a weakening knot.

Another aim is the provision of an attachment to hold a snell and hook away from the line and thus minimize the chance of fouling the hook. In this connection it is an object of this invention to provide an arm for the attachment of a snelled hook, which arm is held out from the fishline by downward force exerted by the sinker. It is a further object to furnish a fishline attachment which will automatically adjust to straight line pull when a fish is hooked, i.e., the force applied by the fish will not tend to bend or distort the attachment itself and the strength of the line will be maximal.

Still another object is to supply a means of fastening to a fishline special items of fishing tackle such as swivels, wire leaders, and guiding said tackle.

In accordance with the present invention there is provided an easily attachable and removable device for holding an object to a flexible line, but away from said line, which comprises: two substantially straight shank portions at an angle with a loop between, one of said shanks having at its end means for the attachment of the object to be held and the other shank portion being adapted for fastening to the line, at its end being bent back on itself to form an open loop, the loop having on its reversing portion means for holding line wrapped around said loop and preventing it from sliding off the loop at its open end. In a preferred embodiment of the device there is made an easily attachable and removable spreader device for holding a snelled fishhook to a fishline but away from said line which comprises a resilient wire bent into two substantially straight shank portions at about a right angle with a closed loop between the shanks in the plane thereby defined but outside the right angle communicating the two portions, one shank portion, the leader part, having an eye at the end thereof for joinder to the fishhook snell and other shank, the attachment portion, having an end bent back on itself twice to form a flat elongated S-curve, the open loop of the S nearer the shank being enlarged at the end thereof to form a loop of shape approximating the circular and the first return bend of the S-curve being close to the shank.

The advantages of the present invention, as well as other objects thereof, will be apparent from the following description in conjunction with the accompanying drawing in which:

FIG. 1 is an elevation of the line attachment device affixed to a fishline with sinker, snell and fishhook in place;

FIG. 2 is an elevation of a similar device having a different embodiment of means for attachment;

FIG. 3 is another elevation of the article, like that of FIG. 1, illustrating the method by which it is positively but easily joined to the line. FIG. 3 also shows the S-curve of the attachment portion in open position;

FIG. 4 is an elevation of a preferred embodiment of the attachment portion of the invented device in closed position;

FIG. 5 is an elevation of the attachment device having an offset eye for guidance of a fishhook, shown here joined to a swivel.

Referring now in detail to the drawing, particularly FIG. 1, the numeral 11 represents a fishline to which is attached by knot 12 a weight or sinker 13. The line attachment device of the invention, here a fishhook holder or spreader 14 is removably affixed to fishline 11 by turning and looping the line 11 about the fishhook attachment device 14 in a very simple manner. Fastened to the fishhook holder at eye 15 by loop 16 in snell 17 is fishhook 18. To assist in holding the snell and hook horizontal as shown it is preferable to loop loop 16 over eye 15 and pull hook, leader and loop 16 up through eye 15 to form a square knot type joinder commonly employed by fishermen, as illustrated. The stiffness of the usual snell material and the upward inclination imparted to the snell and loop by eye 15 cause the leader and hook to extend substantially horizontally in a preferred form of the invention.

The fishhook holder 14 as shown is made of cylindrical thin solid wire, preferably of a strong, springy, corrosion-resistant metal or other resilient substance, e.g., plastic. The cross-sectional shape of the wire may be altered although it is strongly preferred to avoid sharp angles which might cause weakening of the fishline bearing thereon.

Fishhook holder 14 is composed of two shank portions, one of which, the leader portion, 19, has eye 15, in a horizontal plane at its terminal and the other, the attachment portion 20, has an end portion 21 bent back on itself forming an open loop 22 and having on its said reversing end portion 21 means for preventing the line from sliding off the loop and end 21 at its open end 23. In all figures except FIG. 2 that means is shown as another reverse bend 24 of the resilient wire, closing open end 23. In FIG. 2 the numeral 24a denotes a cleat or hook-like member joined to the reverse bend to prevent slipping off of the line. Returning to FIG. 1 the open loop 22 formed by the wire is the loop of the S-curve nearer the shank and is shown enlarged, preferably to a shape approximating the circular. This expansion 25 prevents binding of the line between the sides of the loop when tension is applied to the line 11 drawing and reversing end 21 and the shank 20 together.

Usually the shank portions, and in fact the whole fishline attachment, will be of one-piece wire construction. Nevertheless, while this is most economical it is not necessary, but the shank portions must be at an angle, preferably a right angle, to hold the eye-bearing shank 19 away from line 11. At the intersection of the shanks there is bent a loop 26 which may be open but is advantageously closed as shown. It is preferably in the plane of the shanks but outside the angle thereby defined. The ends 28 and 29 of loop 26, whether closed or not, are in proximity to one another and usually cross to facilitate taking turns of line 11 around that intersection and securing fishhook holder 14 to the line. It is preferred that the loop ends make yielding contact for reasons of design. As will be seen later such construction holds swivels, wire leaders and other tackle in place on the loop while attachment of the invented device is being made. It also results in a sturdier attachment device.

The affixation of the present line attachment device to a flexible line will be illustrated with a fishline having a sinker at one end with the other end being attached to a reel or pole (not shown). The sinker and line are laid flat and the fishhook holding device is positioned at the desired height above the sinker. The line is inserted between attachment shank 20 and reversing end portion 21 thereof into open loop 22. It is then turned around shank 20 and reversing portion 21 one or more times as illustrated 30, after which another or several more turns 31 are made around shank 20 alone. Enlarged loop 25 helps hold line 11 in the loop 22 area, by virtue of its shape preventing sliding of line 11 between shank 20 and reversing portion 21. Of more importance is the alter function of loop 25 in preventing slipping of turns or coils 30 off reversing portion 21 and onto the bottom of loop 22. Of course, tightening line 11 also closes gap 32 between shank 20 and reversing portion 21 and the presence of the turn 30 of line 11 bars slipping of the line through said gap. After being wound around shank 20 the line is wrapped 33 around the intersection of ends 28 and 29 of loop 26 after which a loop 34 is made in line 11, passed through wire loop 26, over shank 19 and eye 15 as shown clearly in FIG. 3, and then drawn tight, positively joining the hook holder to the line. To remove the device it is a simple matter to push line 11 back through loop 26, over eye 15 and unwrap the remaining windings. Release of the line attachment is much easier if care is exercised to maintain line loop 34 untwisted before tightening. In attaching and removing the holder 14 it is not necessary to detach the snelled hook 18 from eye 15. One need only slip loop 34 over the hook as well as over the eye and shank 19 of the spreader portion of the fishhook holder.

The fishhook attachment device as described has distinct advantages not possessed by prior art items of fishing tackle. It is simply, rapidly and positively attachable to a fishline having no working ends and is easily detached therefrom. No knots need be tied and the line is not weakened by cord tightening on itself in a knot under strain. The turning moment of the baited hook is opposed by the downward force exerted by the sinker and so the hook is held horizontal. Perhaps most important of all, due to the method of fastening line 11 with respect to loop 26, when a fish is hooked the force it exerts on the line is transmitted by a straight line pull to the fishing pole (not shown). There is no large bending force applied to the fishhook attachment device, the maximum force so applied being the weight of the sinker, not the weight or pull of the hooked fish.

A preferred method has been described for attaching the fishhook holding device to a fishline. Other less favored ways, including tying, clipping, winding and similar methods will occur to one skilled in this art and may also be employed, although without the distinctive advantages of the described process.

The drawings illustrate several alternate embodiments and modifications of the principal structure already described. In FIGS. 3 and 4 it is shown that reverse bend 24 is drawn to the circularly shaped enlarged loop 25, closing gap 32 when line 11 is tensioned. This results in a smooth joint at 35 and minimizes the possibility of snagging the line at that point.

In FIG. 5 snelled hook 18 is attached to fishhook holder 14 via swivel 36. Shank 19 is bent at 37 to offset eye 15a and allow it to act as a guide for leader 17. Swivels having eyes 38 larger than illustrated may be slipped over eye 15a, shank 19, past the intersection 39 where loop ends 28 and 29 make yielding contact, onto loop 26. If the swivel eye 38 is small, as illustrated, it may be slid into place along reverse bend 24 up shank 20 to loop 26. In either case the swivel should be placed before the line is joined to the fishhook holder and in turn the line and fishhook holder should be joined together before the hook and leader are placed through eye 15a. As shown, a swiveled hook can be joined to a fishline without knotting either the swivel, hook or holder to the line.

The device of FIG. 5 is also useful where rather stiff wire leaders are employed. These are often difficult to loop around an eye in the manner shown as at 16. Instead, they may be slipped along a shank to loop 26, after which the holder may be attached to the line and the leader or snelled hook threaded through guide eye 15a.

The invention has been described with particular reference to preferred embodiments thereof. It is obvious that modifications of the devices shown may be made without departure from the spirit of the invention or going beyond the purview of the claim.

What is claimed is:

In combination with a fishing line, fishhook, leader and sinker, an easily attachable and removable device for holding the leadered hook to the line but away from it, comprising a resilient wire bent into two substantially straight shank portions having ends intersecting each other at about a right angle with a closed loop between the shanks and lying in the plane thereof but outside the angle, communicating the two shanks, one shank portion, the leader portion of the device, having an eye at the end thereof for joinder to the leadered fishhook and the other shank, the attachment portion, having an end bent back on itself twice to form first and second return bends providing a flat elongated S-curve, the loop of the first return bend of the S nearer said other shank being opened at said other shank end to a shape approximating the circular and the first return bend of the S-curve being close to said other shank, the hook being attached to the leader which in turn is held to the eye of the device, the sinker being fastened to the fishline and the line being held in easily removable relationship with the fishhook holding device by being slipped through the circular portion of the first return bend of the S-curve, turned around said other shank and first return bend of the S-curve under the second return bend, turned around the intersection of the shanks exterior to the closed loop, looped through the closed loop over the hook, leader, eye and said one shank and then being drawn tight.

References Cited in the file of this patent

UNITED STATES PATENTS

| | | |
|---|---|---|
| 498,481 | Musser | May 30, 1893 |
| 732,081 | Jacobson et al. | June 30, 1903 |
| 1,351,625 | Crosbie | Aug. 31, 1920 |
| 2,222,277 | Baker | Nov. 19, 1940 |
| 2,589,715 | Lysikowski | Mar. 18, 1952 |
| 2,592,664 | De Mello | Apr. 15, 1952 |

FOREIGN PATENTS

| | | |
|---|---|---|
| 479,613 | Canada | Dec. 25, 1951 |